(12) United States Patent
Motsch et al.

(10) Patent No.: US 7,568,868 B2
(45) Date of Patent: Aug. 4, 2009

(54) DEVICE FOR CONNECTING A SUPPORT ELEMENT TO AN ADD-ON PIECE

(75) Inventors: Uwe Motsch, Rheinfelden (DE); Gerd Koch, Kerkrade (NL)

(73) Assignees: A. Raymond Et Cie, Grenoble (FR); Ford-Werke GmbH, Cologne (DE)

( * ) Notice: Subject to any disclaimer, the term of this patent is extended or adjusted under 35 U.S.C. 154(b) by 135 days.

(21) Appl. No.: 10/596,300

(22) PCT Filed: Dec. 8, 2004

(86) PCT No.: PCT/EP2004/013921

§ 371 (c)(1),
(2), (4) Date: Jan. 23, 2007

(87) PCT Pub. No.: WO2005/059380

PCT Pub. Date: Jun. 30, 2005

(65) Prior Publication Data

US 2007/0223991 A1 Sep. 27, 2007

(30) Foreign Application Priority Data

Dec. 17, 2003 (DE) .................................. 103 59 110

(51) Int. Cl.
*F16B 39/284* (2006.01)
(52) U.S. Cl. ....................................... 411/112; 411/546
(58) Field of Classification Search .................. 411/111, 411/112, 173, 103, 172, 182, 433, 546, 108, 411/114, 119–125, 127, 134
See application file for complete search history.

(56) References Cited

U.S. PATENT DOCUMENTS

| 4,863,327 A | * | 9/1989 | Poupiter ...................... 411/112 |
| 5,256,018 A | * | 10/1993 | Rattmann et al. ............ 411/175 |
| 5,536,125 A | * | 7/1996 | Gaw, Jr. ....................... 411/182 |
| 6,290,426 B1 | * | 9/2001 | van Gijsel et al. ......... 403/374.3 |
| 7,204,666 B2 | * | 4/2007 | Hullman et al. .............. 411/111 |

FOREIGN PATENT DOCUMENTS

| DE | 1923321 | 11/1969 |
| DE | 19722778 | 5/1998 |
| EP | 0950821 | 10/1999 |
| EP | 1026415 | 8/2000 |
| WO | 9813607 | 4/1998 |

* cited by examiner

*Primary Examiner*—Gary Estremsky
(74) *Attorney, Agent, or Firm*—Baker & Daniels LLP

(57) ABSTRACT

A plug-in device for connecting a support element (27) to an add-on piece (26). The device includes a plug-in element which can be inserted into a recess of the support element (27) and includes at least one laterally projecting bearing section (6, 7) serving to bear externally against the support element (27), and an abutment region (3). An inner element (12) has a threaded region (14) for receiving a screw (31) and at least one counter-element (22, 23). The inner element (12) is received in the plug-in element (1) so as to be axially displaceable. A threaded shank (32) of the screw (31) comes into engagement with the abutment region (3), which forms a stop for the screw (31) in the direction of insertion. The add-on piece (26) can thus be fixed at a distance from the support element (27) to secure the add-on piece to the support element.

7 Claims, 3 Drawing Sheets

US 7,568,868 B2

DEVICE FOR CONNECTING A SUPPORT ELEMENT TO AN ADD-ON PIECE

CROSS-REFERENCE TO RELATED APPLICATION

This application is a U.S. National Phase Patent Application based on International Application Serial. No. PCT/EP2004/013921 filed Dec. 8, 2004, the disclosure of which is hereby explicitly incorporated by reference herein.

BACKGROUND OF THE INVENTION

The invention concerns a device for connecting a support element to an add-on piece, comprising a plug-in element that can be inserted into a recess of the support element and that comprises at least one laterally projecting bearing section having at least one counter-element that confronts the or each bearing section and at least one threaded region configured at least sectionally with a thread structure.

Such a device is known from DE-OS [Pre-Published German Patent Application] 19 23 321. The prior device comprises a cage-like plug-in element provided with at least two laterally projecting bearing sections which, when the plug-in element is inserted into a recess of a support element, come to rest in the direction of insertion on the outside of the support element, at the edge of the recess. Inwardly of each bearing section, an edge web is provided on which is configured as a resilient, outwardly projecting counter-element that confronts the bearing section. The prior device is further provided with a central web that connects the edge webs at the opposite ends from the bearing sections. Configured in the central region of the central web is a threaded region, which is provided with a thread structure into which a screw can be inserted that engages through an add-on part which is to be fixed to the support element. When the prior device is used as intended, the plug-in element is inserted through the recess of the support element until the bearing sections bear against the outer face of the support element, and the counter-elements, after deflecting as they are passed through the recess, project outward again past the edge region of the support element, engaging around and behind the recess.

In this arrangement the plug-in element is anchored in the support element, and an add-on part through which a screw engages can be connected to the support element by screwing the screw into the thread structure until the add-on part bears against the bearing sections of the plug-in element, the counter-elements thereupon securing the plug-in element against being withdrawn.

The object of the invention is to specify a device of the kind recited at the beginning hereof in which an add-on part can be connected to a support element at a distance from said support element by tightening a screw.

SUMMARY OF THE INVENTION

This object is achieved according to the invention in a device of the kind recited at the beginning hereof in that an inner element comprising the threaded region and the or each counter-element is present, the inner element is received in the plug-in element so as to be axially displaceable, and the plug-in element is provided with an abutment region that comes into engagement with a screw screwed into the threaded region and forms a stop for the screw.

By virtue of the device comprising an inner element that is axially displaceable in the plug-in element and on which the threaded region and the or each counter-element is configured, and by virtue of the plug-in element possessing an abutment region that forms a stop for the screw, when a screw is rotated into the thread structure the inner element moves against the direction of insertion of the screw until the or each counter-element bears against that face of the edge region of the recess receiving the plug-in element that confronts the or each bearing section. In this arrangement of the device, the add-on part is disposed at a distance from the support element and fixedly connected thereto.

In one form thereof, the present invention provides a device for connecting a support element to an add-on piece, including a plug-in element that can be inserted in a recess of the support element and includes at least one laterally projecting bearing section, including an inner element having a threaded region, configured at least sectionally with a thread structure, and at least one counter-element that confronts the or each bearing section, the inner element being received in the plug-in element so as to be axially displaceable, the inner element having as a central element a face plate in the center of which the threaded region with the thread structure is configured, and the face plate being adjoined by two edge webs of the inner element that are oriented substantially parallel to each other and on which the counter-elements are configured, characterized in that the plug-in element is provided with an abutment region that comes into engagement with a screw screwed into the threaded region and forms a stop for the screw, so that when the screw is rotated into the thread structure, the inner element moves against the direction of insertion of the screw until the or each counter-element bears against that face of the edge region of the recess receiving the plug-in element that confronts the or each bearing section.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
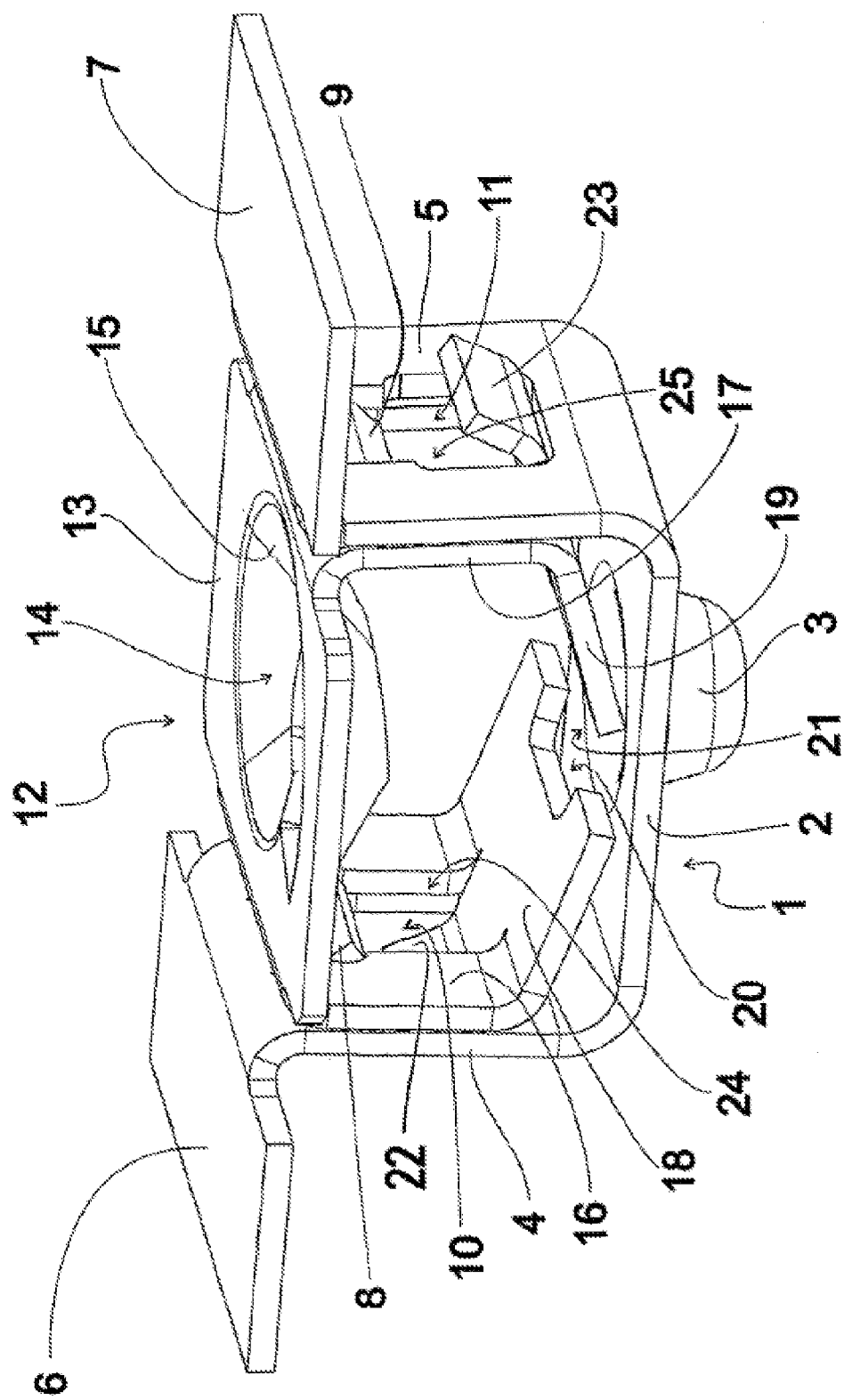
FIG. 1 is a perspective representation of a preferred exemplary embodiment of the invention, with a plug-in element and an inner element each formed from strips of sheet metal.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DESCRIPTION OF THE PRESENT INVENTION

FIG. 1 shows a preferred exemplary embodiment of an inventive device in perspective representation. The exemplary embodiment according to FIG. 1 is provided with a plug-in element 1, formed from a pre-punched sheet metal strip, that comprises a central web 2, in the central region of which an abutment well 3 is configured as a depression and an abutment region for a screw (not shown in FIG. 1). Configured on both sides of central web 2, by bending the sheet metal strip substantially perpendicularly in the same direction in each case, are a first edge web 4 and a second edge web 5 oriented parallel to each other. Further substantially perpendicular bending of the free ends of the sheet metal strip in an outward direction results in the formation, as bearing sections, of a first bearing tongue 6 and a second bearing tongue 7 lying in substantially one plane.

Formed on the ends of edge webs 4, 5 opposite from central web 2 are a first stop lug 8 and a second stop lug 9, which are oriented such that they are angled toward each other and are aimed inward in the direction of central web 2. Configured in each edge web 4, 5 are, respectively, a first edge recess 10 and a second edge recess 11, which extend in the longitudinal direction from stop lugs 8, 9, respectively, to the vicinity of central web 2.

In the exemplary embodiment of FIG. 1, the inventive device is additionally provided with an inner element 12, also formed from a pre-punched sheet metal strip. Inner element 12 has as its central element a face plate 13, in the center of which is provided a threaded region 14 having a thread structure 15 formed by edges lying on a spiral line. Configured on inner element 12 on mutually opposite edge faces of face plate 13, by substantially perpendicular bending, are a first edge web 16 and a second edge web 17, whose outer faces each confront the assigned edge web 4, 5 of plug-in element 1. Inner element 12 is also provided with a first inner tongue 18 and a second inner tongue 19, which extend inwardly toward each other from edge webs 16, 17 and are configured at their edges with a first tongue recess 20 and a second tongue recess 21, respectively.

In the region of transition between the edge webs 16, 17 of inner element 12 and the tongue recesses 20, 21, there originate as counter-elements a first counter-lug 22 and a second counter-lug 23, respectively, which are bent outward to open up a first edge recess 24 and a second edge recess 25, respectively, in edge webs 16, 17 of inner element 12.

In operation, plug-in element 1 and inner element 12 are arranged with respect to each other such that stop lugs 8, 9 of plug-in element 1 engage in edge recesses 24, 25 of inner element 12 and counter lugs 22, 23 of inner element 12 engage in edge recesses 10, 11 of plug-in element 1. Inner element 12 is thereby maintained in plug-in element 1 in a loss-proof and axially displaceable manner.

Figure 2:
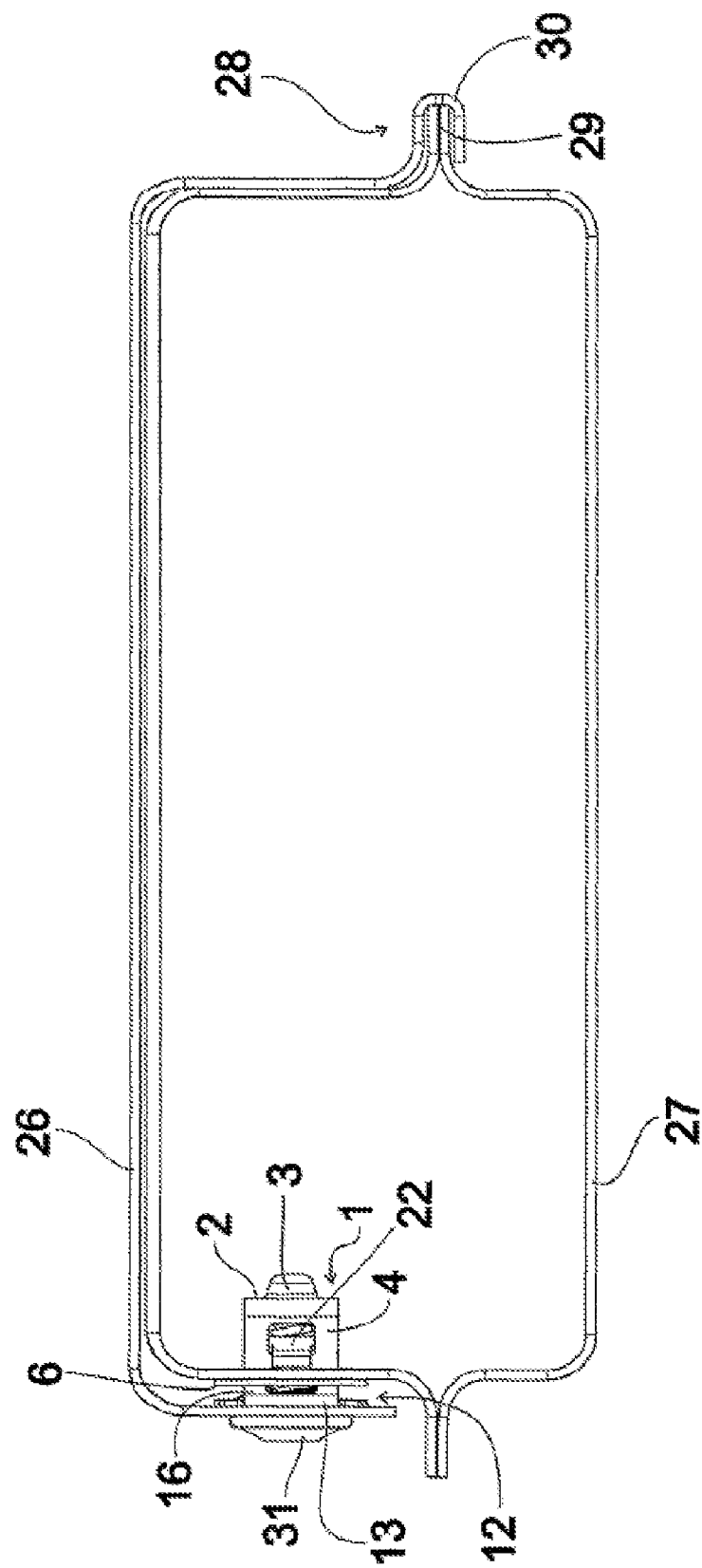
FIG. 2 is a side view of the exemplary embodiment of FIG. 1 in an installed situation.

FIG. 2 is a side view of the exemplary embodiment of FIG. 1 in an installed situation for connecting an add-on piece 26 to a support element 27, which are linked to each other via a loose articulation 28 on a side opposite the position of installation of the inventive device. Articulation 28 is devised by means of a web 29 configured on support element 27 and a bend 30 configured on a free end of add-on piece 26, it being necessary for bend 30 to be constantly pressed against web 29 in order for there to be a play-free connection between add-on part 26 and support element 27.

To achieve this, plug-in element 1 of the inventive device is inserted into a recess of support element 27, whereupon bearing tongues 6, 7 bear against the side of support element 27 confronting add-on part 26. By screwing a screw 31 that engages through add-on part 26 into the thread structure 15 configured in the face plate 13 of inner element 12 until the free end of screw 31 engages in abutment well 3, and by further tightening screw 31 until counter-lugs 22, 23 bear against the side of support element 27 facing away from add-on piece 26, add-on piece 26 is lifted, in the region of the installed position of the inventive device, away from support element 27 to a maximum distance that it assumes in a final position, thereby placing articulation 28 under tensile stress.

Figure 3:
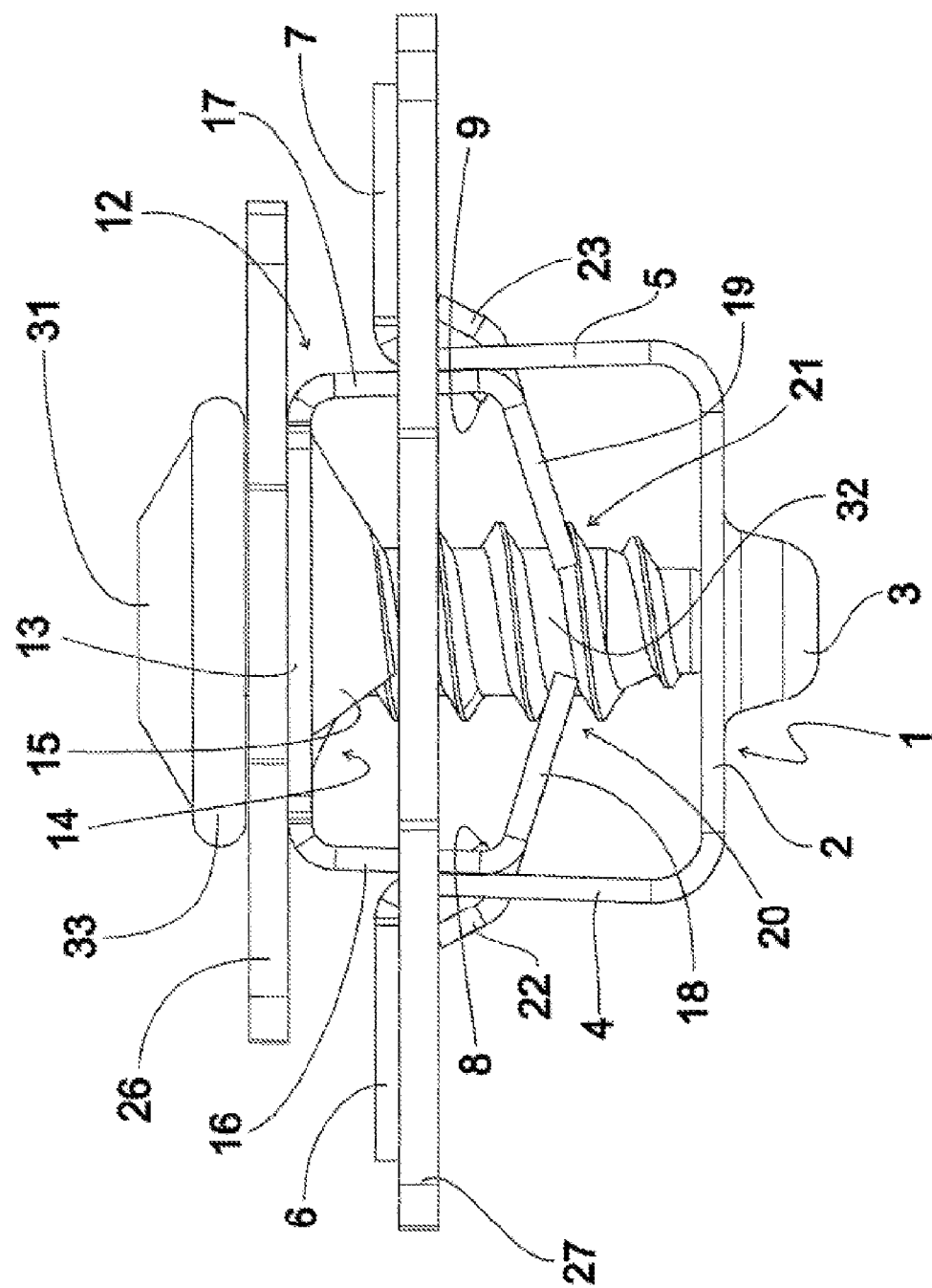
FIG. 3 is a side view of the exemplary embodiment of FIG. 1 in the installed situation, enlarged and rotated 90 degrees with respect to the representation of FIG. 2.

FIG. 3 shows the exemplary embodiment of FIG. 1 in the installed situation, in a side view that is enlarged and rotated 90 degrees with respect to the representation of FIG. 2. It is apparent from FIG. 3 that inner tongues 18, 19 partially—depending on the depth of tongue recesses 20, 21—embrace a threaded shank 32 of screw 31 and thereby guide screw 31, as it is being tightened, in the direction of abutment well 3 until the free end of threaded shank 32 engages in abutment well 3, which forms a stop in the direction of insertion. It can further be appreciated from FIG. 3 that, the length of the threaded shank 32 of screw 31 and the relevant dimensions of plug-in element 1 and of inner element 12 being adjusted to one another, support element 27 is clamped between bearing tongues 6, 7 and counter-lugs 22, 23 and add-on piece 27 is clamped between a head 33 of screw 31 and the face plate 13 of inner element 12, and are thereby fixedly connected to each other.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A device for connecting a support element to an add-on piece, said support element including an aperture, said device comprising:

a generally U-shaped plug-in element adapted to be inserted into said aperture, said plug-in element having two parallel legs, a connecting region connecting said two parallel legs, and two laterally projecting bearing sections disposed away from and generally parallel to said connecting region, said connecting region having an abutment region;

an inner element disposed between said two legs, said inner element having two edge webs disposed substantially parallel to said two parallel legs, each said edge web having a counter lug disposed outwardly of and at an angle to said associated edge web and directed toward a bearing section, said inner element movable with respect to said plug-in element in a direction parallel to said parallel legs, said inner element having a face plate spaced from and parallel to said connecting region, said face plate having a threaded region therein; and a fastener threadedly disposed in said threaded region, said fastener having an end adapted to contact said abutment region, whereby, when a said add-on piece and a said support piece are assembled and said fastener is threaded into said threaded region, said fastener end engages said abutment region and causes said inner element to move in a direction parallel to said parallel legs and away from said plug-in element until said counter lugs bear against the said support element, thereby securing said support element to said add-on piece.

2. The device according to claim 1 wherein said inner element includes two inner tongues which extend toward said abutment region.

3. The device of claim 1 wherein said plug-in element is formed from a strip of sheet metal.

4. The device of claim 1 wherein said two edge webs each include an inner tongue, each said inner tongue disposed at an angle relative to said parallel legs, said inner tongues slanting toward each other.

5. The device of claim 1 wherein said parallel legs each include a slot through which one said counter lugs extends.

6. The device of claim 1 wherein said inner element is formed from a strip of sheet metal.

7. The device of claim 1, wherein said abutment region includes an abutment well formed as a depression in said connecting region of said plug-in element.

* * * * *